US012793126B2

(12) United States Patent
Okolorie

(10) Patent No.: US 12,793,126 B2
(45) Date of Patent: Nov. 10, 2026

(54) COMPUTER IMPLEMENTED METHOD AND SYSTEM FOR PROCESSING A RAFFLE SALE

(71) Applicant: MASTERCARD INTERNATIONAL INCORPORATED, Purchase, NY (US)

(72) Inventor: William Okolorie, London (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 67 days.

(21) Appl. No.: 18/942,170

(22) Filed: Nov. 8, 2024

(65) Prior Publication Data

US 2025/0156937 A1 May 15, 2025

(30) Foreign Application Priority Data

Nov. 10, 2023 (EP) .................................... 23209217

(51) Int. Cl.
*G06Q 30/08* (2012.01)
*G06Q 20/10* (2012.01)

(52) U.S. Cl.
CPC ........... *G06Q 30/08* (2013.01); *G06Q 20/102* (2013.01)

(58) Field of Classification Search
CPC ................. G06Q 30/08; G06Q 20/102; G06Q 30/0207–30/0277; G06Q 50/01; H04L 67/20; H04L 67/306
See application file for complete search history.

(56) References Cited

U.S. PATENT DOCUMENTS

| | | | | |
|---|---|---|---|---|
| 8,255,278 | B1 * | 8/2012 | Young | G06Q 20/322 705/17 |
| 9,430,910 | B2 | 8/2016 | Mackenzie | |
| 11,321,149 | B1 * | 5/2022 | McClure | G06Q 20/4037 |
| 11,545,007 | B2 | 1/2023 | Jaradeh et al. | |
| 12,567,101 | B1 * | 3/2026 | Yergan | G06Q 30/0635 |

(Continued)

FOREIGN PATENT DOCUMENTS

| | | | |
|---|---|---|---|
| KR | 100455811 | B1 | 11/2004 |
| KR | 20050001921 | A | 1/2005 |

(Continued)

OTHER PUBLICATIONS

A_Study_on_Promotional_Management_Honeypot (Year: 2021).*

(Continued)

*Primary Examiner* — Gautam Ubale
(74) *Attorney, Agent, or Firm* — Loza & Loza, LLP

(57) ABSTRACT

Computer implemented method for processing a Raffle Sale, comprising:
Putting on sale, by a Merchant, of a product and/or a service via a Raffle Sale,
Defining, by the Merchant, criteria for the selection of Winners from a group of Raffle Sale participants,
Receiving, by the Merchant, a request of a User to be added to the group of Raffle participants and the PAN related with the User,
Sending, by the Merchant, the PAN of the User, to a Financial Institution, responsible for the payment processing of payments linked with the PAN,
Applying, by the Financial Institution, the criteria for the selection of Winners to select a number of Winners,
Sending, by the Financial Institution, a list of selected Winners to the Merchant.

11 Claims, 2 Drawing Sheets

(56) References Cited

U.S. PATENT DOCUMENTS

| | | | | |
|---|---|---|---|---|
| 2007/0179839 | A1 | 8/2007 | Neemann | |
| 2008/0110978 | A1 * | 5/2008 | Blume | G06Q 20/403 235/380 |
| 2009/0182586 | A1 * | 7/2009 | Cohane | G06Q 40/12 705/40 |
| 2011/0006113 | A1 * | 1/2011 | Uchikura | G06Q 30/06 235/380 |
| 2015/0332553 | A1 * | 11/2015 | O'Hagan | G07F 17/3272 463/17 |
| 2016/0180653 | A1 | 6/2016 | Cooley et al. | |
| 2018/0060847 | A1 * | 3/2018 | Burch | G06Q 30/0601 |
| 2018/0089648 | A1 * | 3/2018 | Groarke | G06F 16/951 |
| 2018/0096387 | A1 * | 4/2018 | Vaidyanathan | G06Q 30/0253 |
| 2018/0330353 | A1 * | 11/2018 | Prabhune | G06Q 20/207 |
| 2020/0219079 | A1 * | 7/2020 | Christensen | G06Q 20/204 |
| 2022/0253345 | A1 * | 8/2022 | McClure | G06F 9/541 |
| 2022/0414702 | A1 * | 12/2022 | Qi | G06Q 20/102 |

FOREIGN PATENT DOCUMENTS

| | | | |
|---|---|---|---|
| KR | 100736175 | B1 | 7/2007 |
| KR | 101355493 | B1 | 2/2014 |

OTHER PUBLICATIONS

Predicting merchant future performance using privacy-safe network-based features (Year: 2023).*

Purchase-Based_Analytics_and_Big_Data_for_Actionable_Insights (Year: 2019).*

* cited by examiner

COMPUTER IMPLEMENTED METHOD AND SYSTEM FOR PROCESSING A RAFFLE SALE

FIELD OF THE INVENTION

The disclosure relates a computer implemented method and system for processing a Raffle Sale, wherein a Merchant puts a product and/or a service on sale via a Raffle Sale, wherein a number of selected Winners from a group of Raffle Sale participants receive the right to purchase said product and/or service.

BACKGROUND OF THE INVENTION

The disclosure relates to a method, which allows Merchants to organise a Raffle Sale for selling products and/or services. Merchants can use a Raffle Sale, for instance, if they believe in advance of the sale that the demand for the product will exceed the actual offer. This type of sale is specifically adapted for clothing items, such as shoes, which are in high demand and which are sold at reasonable prices. The Raffle Sale permits a manufacturer to deal with the problem of providing a limited offer while at the same time access is provided to a large number of customers.

Another reason to organise a Raffle Sale could be the wish of a Merchant to create an event around the introduction of a new product. In that case, the Raffle Sale would allow a selected number of lucky Winners of the Raffle Sale, for instance, early access to said new product.

To organise a Raffle Sale, a Merchant will normally advertise the details of an upcoming Raffle Sale via a variety of communication channels. One of those channels will probably be the Merchant's website whereon the Merchant can ask attention for the upcoming Raffle Sale. The Merchant can also use direct marketing tools, like the sending of emails and text messages to recurrent customers.

Once the Merchant has opened the Raffle Sale, participants can inscribe for the Raffle Sale by following a procedure that the Merchant has put in place for that purpose. Inscribing for a Raffle Sale can mean, for instance, that a customer completes a form on the Merchants website. This form will allow the customer to identify himself or herself and will allow the customer to express his or her intention to buy the concerned product and/or service. Moreover, the form will allow the Merchant to obtain additional information about the customer, like the details of the payment card the customer would like to use for the payment of the product and/or service, in case the customer is one of the lucky Winners.

Merchants can customize the information they would like to obtain from participants and can make the requested information also dependent on an existing relationship with the customer, like the existence of a client record with the Merchant.

The Merchant will allow the addition of participants to the Raffle Sale, for instance, until a certain maximum number of participants is reached and/or until a certain final date and time, set in advance by the Merchant.

After the close of the Raffle Sale, the Merchant is faced with the task of selecting a number of lucky Winners, using a predetermined selection process to identify the lucky Winners.

In a further step, the Merchant will inform the lucky Winners of that fact that they have won. For the lucky Winners, the Merchant would also need to complete the payment process for the related products and/or services. At the same time, the Merchant will have to inform all the other participants that, unfortunately, they have not been selected.

It will be understood that the above-mentioned procedure for organising a Raffle Sale is a time consuming and therefore an expensive process for a Merchant. Moreover, the Merchant will not have dedicated tools to execute the Raffle Sale in an efficient manner. This means that the Raffle Sale could generate time consuming and therefore costly problems, for instance, in case the Merchant has difficulties with the processing of the payments of lucky Winners and at least a number of these payments cannot be completed.

The complexity of organising a Raffle Sale can create an obstacle for a Merchant to use this type of sale, while the Raffle Sale, as such, may very well be adapted for selling products and services for the Merchant.

In view of the problems highlighted above and considering the existing complexity of organising a Raffle Sale, it is an objective of the present disclosure to provide a method that allows a Merchant to organise a Raffle Sale in an efficient manner, using a dedicated tool.

OBJECTS OF THE INVENTION

According to a first aspect, the disclosure relates to a computer implemented method for processing a Raffle Sale, comprising the steps of:

- Putting on sale, by a Merchant, of a product and/or a service via a Raffle Sale, wherein a number of selected Winners from a group of Raffle Sale participants receive the right to purchase said product and/or service,
- Defining, by the Merchant, criteria for the selection of Winners from a group of Raffle Sale participants,
- Requesting, by a User, to be added to the group of Raffle Sale participants and presenting, by said User, a PAN as payment method,
- Receiving, by the Merchant, the request of the User to be added to the group of Raffle participants and the PAN related with the User,
- Sending, by the Merchant, the PAN of the User as a participant to the Raffle Sale, to a Financial Institution, responsible for the payment processing of payments linked with the PAN,
- Receiving, by the Financial Institution, the PAN of the User and adding the User to a group of Raffle Sale participants,
- Applying, by the Financial Institution, the criteria for the selection of Winners from the group of Raffle Sale participants to select a number of Winners,
- Sending, by the Financial Institution, the selected Winners to the Merchant,
- Receiving, by the Merchant, the selected Winners of the Raffle Sale, and
- Informing, by the Merchant, the selected Winners and processing the payment of the product and/or service for the selected Winners.

According to an embodiment, after the step of receiving, by the Merchant, of the request of the User to be added to the group of Raffle participants and the PAN related with the User the method further, comprises:

- Confirming, by the Merchant, the receipt of the request to the User.

According to an embodiment, the step of defining, by the Merchant, criteria for the selection of Winners from a group of Raffle Sale participants comprises:

- Defining random-based selection criteria for selecting Winners.

According to an embodiment, the step of wherein the step of defining, by the Merchant, criteria for the selection of Winners from a group of Raffle Sale participants comprises:

Defining criteria for the selection of Winners, based on historic payment data, linked with a PAN.

According to an embodiment, the step of Receiving, by the Financial Institution, the PAN of the User and adding the User to a group of Raffle Sale participants, further comprises:

Adding, by the Financial Institution, an anonym tag to the PAN to obtain an anonym RaffleID linked to the PAN.

According to an embodiment, the method further comprises:

Using, by the Financial Institution, a Database comprising information relating to financial transactions and/or behaviour relating to the PAN to obtain consumer information related to the PAN.

According to an embodiment, the method further comprises:

Using, by the Financial Institution, the obtained consumer information to create a Consumer Profile linked to the PAN.

According to an embodiment, the step of applying, by the Financial Institution, the criteria for the selection of Winners from the group of Raffle Sale participants to thereby select a number of Winners comprises:

Comparing, by the Financial Institution, the obtained Consumer Profiles with the defined selection criteria based on historic payment data, linked with a PAN.

According to an embodiment, the method further comprises:

Informing, by the Merchant, all Raffle Sale participants who have not been selected as Winners.

According to a second aspect, the disclosure relates to a data processing system comprising a processor configured to perform the method of the disclosure.

According to a third aspect, the disclosure relates to a computer program product comprising instructions, which, when the program is executed by a computer, cause the computer to carry out the method of the disclosure.

According to a fourth aspect, the disclosure relates to a computer-readable storage medium comprising instructions which, when executed by a computer, cause the computer to carry out the method of the disclosure.

DETAILED DESCRIPTION OF THE DRAWINGS

Figure 1:
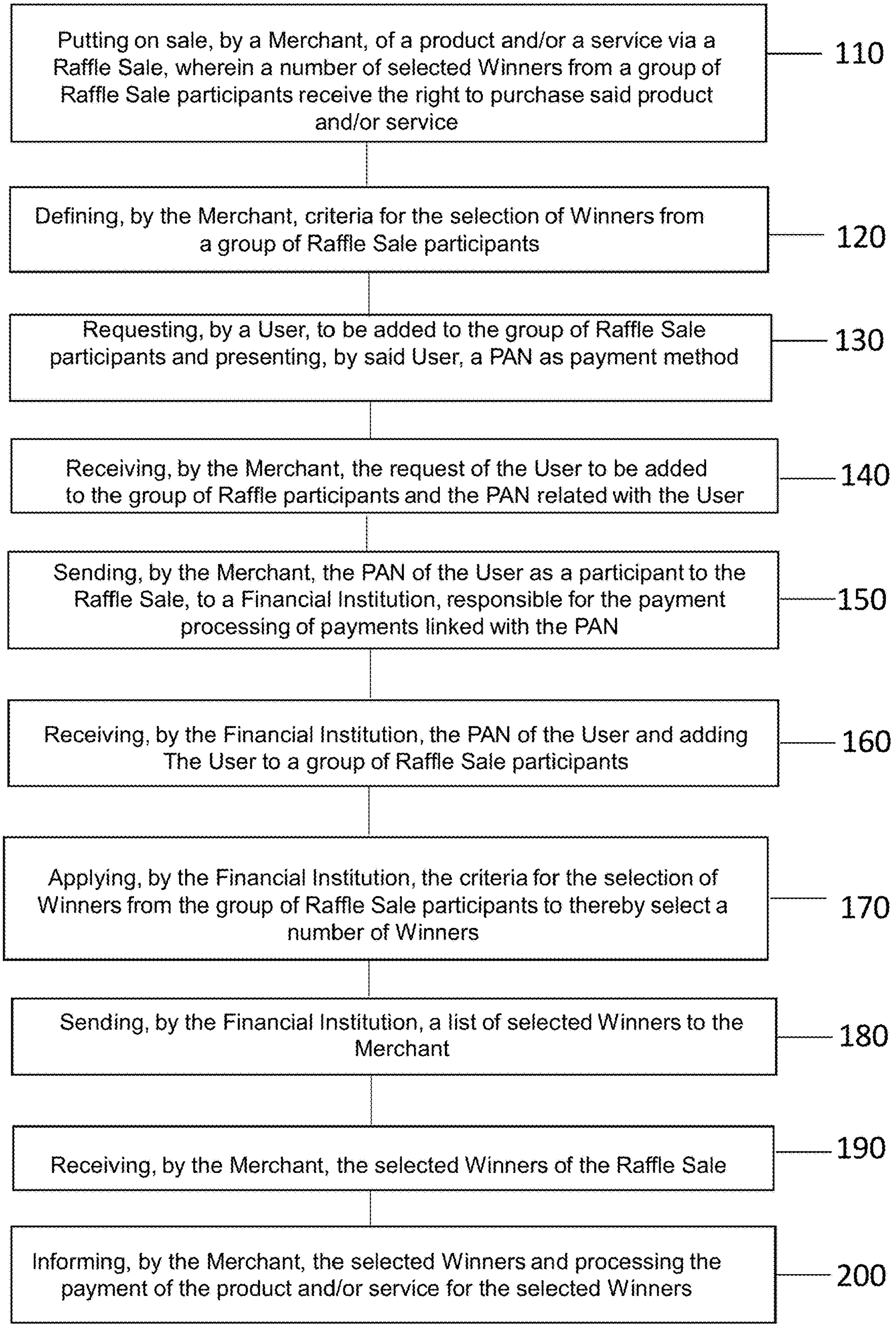
FIG. 1 shows a flow chart identifying the different steps of the method of the disclosure and FIG. 2 schematically shows the flow of communications and information between a User, a Merchant and a Financial Institution, according to an embodiment of the disclosure.

In the context of this disclosure, the term Raffle Sale is used. The term Raffle Sale refers to a competition wherein participants try to win the chance of buying a certain product and/or service. In contrast with a normal raffle, the Winners do not get a price in the form of a product and/or service, but they get a price in the form of an invitation to buy a product and/or service.

In the context of this disclosure, the term 'payment card' is used. As examples of payment cards, reference is made to Prepaid, Debit and Credit. It is noted that the present description relates to the improvement of risk assessment linked to the use of a payment card. It should be understood that the description is not limited to the example of Prepaid, Debit and Credit cards, but also refers to any other form of payment card, for which, prior to acceptance of the card, an assessment linked to the risk of the card could be envisaged.

In the present disclosure, the term "creditworthiness of a User" is used. In the context of this description, a User is considered creditworthy if the User can fully pay the product and/or service the User commits to paying for by presenting their payment card. If, at any moment during the transaction, for instance during the check-out step, the User cannot fully pay for a requested product and/or service, which means that there is a difference between the amount the User is required to pay and the amount the User is able to pay, the User is not considered to be creditworthy.

In the present disclosure, the term 'payment related risk information' is used. This term refers to any information relating to financial transactions related to a primary account number (PAN) of a User and/or the behaviour of the User linked to said PAN.

In the present disclosure, the method that is used for processing a Raffle Sale is presented as a number of separate, numbered steps. Despite the fact that the method is presented as a series of subsequent steps, it should understood that the order of the presented steps could be changed and that some steps could be executed in parallel, without changing the outcome of the method.

In the present disclosure, the term User is used to refer to a costumer who is in possession of a payment card. The User could be an individual or a legal entity using a payment card as payment method.

In the present disclosure reference is made to communication between a User, a Merchant, a Financial Institution and a Database. In the context of the disclosure, it should be understood that this communication is a communication via technical means, such as a computer and a server. The User can, for instance, communicate with the Merchant by means of an email, using his own computer to connect with the server of the Merchant. The Merchant and the Financial Institution can communicate using the servers of both parties.

In the present disclosure, several examples are described of Merchants that could use the improvements of the present disclosure. In particular, reference is made to the use of the improvements for Merchants operating in the industry of selling fashion items which are high in demand and which are on sale for reasonable prices, which means prices accessible for a large part of the consumers. It should be understood that these are non-limiting examples of markets for which the method according to the disclosure could be advantageously used. The improvements provided by the method system according to the description can also be used in other industries, like in general in e-commerce (online) transactions.

A first problem that is related with organising a Raffle Sale for a Merchant, is the fact that processing a Raffle Sale is a time consuming and therefore expensive process. Moreover, a Merchant will not have dedicated tools to execute the Raffle Sale in an efficient manner. This means that the Raffle Sale could generate time consuming and therefore costly problems, for instance, in case the Merchant has problems with the processing of the payments of lucky Winners and at least a number of the payments cannot be completed.

A further, and related problem, related with a Raffle Sale, is the fact that there is a time delay between the moment that a User expresses his or her intend to buy a product and/or service and the moment that the payment for the product is processed and completed.

Because of this time delay, the Merchant does not know at the time a User expresses his or her intention to participate with the Raffle Sale, whether the User, in case selected as lucky Winner, is able to pay for the requested product and/or service at the stage of payment processing. The problem for the Merchant is, that the information the Merchant receives is at PAN level only. At PAN level, the PAN will allow the identification of the issuer of typically a Prepaid, Debit or Credit card and also the particular cardholder account. While this information is useful, in practice, it can prove to provide too few details about the actual possibility of the User to pay for a product and/or service. Thus, a Merchant can only find out at the stage of payment processing, whether a Pan provided by a User can be used to pay for the product and/or service, or whether the payment method is refused.

It is noted that the more sophisticated Merchants will operate their own assessment software tools to perform the assessment of the creditworthiness of new Users. Such assessment tools can comprise Artificial Intelligence (IA) or Artificial Intelligence based modules to enhance the performance of such assessment tools. The problem with the use of such tools is that they cannot provide optimal results if the input provided to these tools is insufficient.

Yet another problem, related to a Raffle Sale is that fact that individual User could create multiple Merchant accounts and therefore multiple entries for the same Raffle Sale. A Merchant will not possess dedicated means to identify efficiently multiple entries for one User. This means that the fair chance of winning for other participants is hampered.

Another problem is that fact a robot, or internet bot is used which could disrupt and diminish the proper functioning of a Raffle Sale.

In view of the above described problems and limitations of procedures and systems according to the prior art, it is an objective of the disclosure to provide a computer implemented method for efficiently processing a Raffle Sale.

According to the present disclosure, it is recognised that financial institutions responsible for the processing of payments related to Prepaid, Debit and Credit cards have at their disposal databases comprising data relating to transactions and data relating to behaviour of Prepaid, Debit and Credit card Users. An example of such a financial institution responsible for payment processing is Mastercard©. According to the present disclosure it is appreciated that the Merchants do not have access to information regarding the payment history related to a PAN and related insolvency risks, whilst Financial Institutions, like Mastercard©, possess such historical transaction information of Users and are therefore able to assess risk.

According to the present disclosure, it is recognised that the databases operated by the financial institutions that process payments comprise valuable information about the transactions completed by Users in the past that could help Merchants to enrich the information on which they base their own assessment of creditworthiness. Providing such additional information to Merchants would contribute to a higher accuracy of the assessment of creditworthiness that is completed by the Merchants and would help to mitigate delinquency linked to the use of payments cards.

FIG. 1 shows a flow chart of the steps of the method according to the disclosure.

In a first step 110, a Merchant puts on sale a product and/or a service via a Raffle Sale. In this Raffle Sale a number of selected Winners from a group of Raffle Sale participants receive the right to purchase the product and/or service.

The product and/or service is put on sale using electronic means, such as a server of the Merchant which is used to run the website of the Merchant.

In second step 120, the Merchant, defines criteria for the selection of Winners from a group of Raffle Sale participants.

These criteria could be random-based criteria, such as every $30^{th}$ entry is a winner. The criteria could also be linked to a date and time. The Merchant could decide that every first 30 entries of each day are the Winners.

Once the mentioned criteria have been defined, these will be stored in electronic format on the server of the Merchant. This means that the Merchant can publish these criteria via electronic means and can communicate these criteria to other parties, for instance by sending these criteria from the server of the Merchant to the server of a Financial Institution.

In an embodiment of the disclosure, the criteria for selecting Winners from a group of Raffle Sale participants comprises defining criteria for the selection of Winners, based on historic payment data, linked with a PAN. This means that the Merchant prefers to use criteria that are linked to the historic payment data linked to a PAN that is presented by the User to identify as a Raffle participant and as a payment method.

In a third step 130, a User requests to be added to the group of Raffle Sale participants and presents a PAN as payment method.

The User will send this request via electronic means, for instance, by sending an SMS message or an email. Alternatively, the request could be entered on a website run of the server of the Merchant.

In a fourth step 140, the Merchant receives the request of the User to be added to the group of Raffle participants and the PAN related with the User.

In a fifth step 150, the Merchant sends the PAN of the User as a participant to the Raffle Sale, to a Financial Institution, responsible for the payment processing of payments linked with the PAN.

The forwarding of the request from the Merchant to the Financial Institution will take place via electronic means.

An example of such a financial institution responsible for payment processing is Mastercard©. According to the present disclosure it is appreciated that the Merchants do not have access to information regarding the payment history linked to a PAN, whilst Financial Institutions, like Mastercard©, possess the historical transaction information of Users at PAN level and therefore are able to create based on this historical transaction information, consumer profiles.

In a sixth step 160, the Financial Institution receives the PAN of the User and adds the User to a group of Raffle Sale participants. This means that the Financial Institution creates, for every Raffle Sale they process, a complete list of Raffle Sale participants.

The reception of the information relating to the User and the creation of the list of participants will be done using electronic means, such as the server of the Financial Institution.

In a seventh step 170, the Financial Institution applies the criteria for the selection of Winners from the group of Raffle Sale participants to the list of participants, to thereby select a number of Winners.

In an eighth step 180, the Financial Institution sends a list of selected Winners to the Merchant.

The sending of information from the Financial Institution to the Merchant will need to use of electronic means, such as the server of the Financial Institution and the server of the Merchant.

In a ninth step 190, the Merchant receives the list of selected Winners.

In a tenth step 200, the Merchant informs the selected Winners and processes the payment of the product and/or service for the selected Winners.

The step of informing the lucky Winners and the step of processing of the related payments will be executed using electronic means such as the servers of the Merchant.

As will be understood from the example discussed below, the method according to the present disclosure provides an efficient means for processing the registration of Raffle Sale participants, the selection of Winners and the payment of the related product and/or service for the Winners.

EXAMPLE

Figure 2:
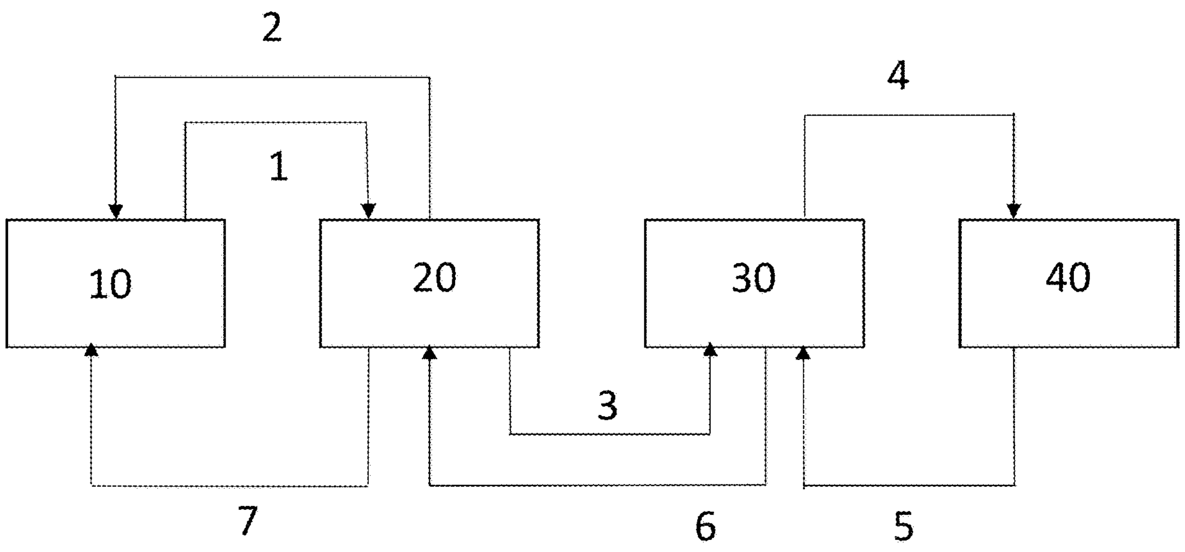

The transfer of information between parties during the sequence of steps as shown in FIG. 1 is schematically represented in the block diagram of FIG. 2.

According to FIG. 2, box 10 represents a User, such as a User who enrols for a Merchant's Raffle Sale, with the purpose to purchase a service and/or a product from the Merchant. Box 20 represents a Merchant with whom the User 10 wishes to communicate to obtain said product and/or service. Box 30 represents a Financial Institution responsible for the processing payments, such as, for instance, Mastercard®. Box 40 represents a Database operated by the Financial Institution 30, such as a Database in the form of an AI engine, comprising data relating to financial transactions of Users and/or data relating to the behaviour of Users.

In a first step 1, the User 10 contacts a Merchant 20 to enrol for a Merchant's Raffle Sale. The User 10 provides a valid PAN as identifications means and as payment method. In the example of the financial institution 30 being Mastercard®, the PAN provided by the User 10 is a valid Mastercard® PAN.

The Merchant 20 receives the request of the User 10 to participate in the Raffle Sale. In response, the Merchant 20 could confirm the reception of this request in step 2.

In step 3, the Merchant 20 forwards the PAN of the User 10 to the Financial Institution 30 and indicates that the User would like to participate in the Raffle Sale.

The Merchant 20 and the Financial Institution 30 will have to agree on a set of criteria that is used to select a number of lucky Winners from the group of participants to a Raffle Sale. These criteria could be formulated by the Merchant 20 or could be agreed by the Merchant 20 and the Financial Institution 30 together, whereby the Merchant 20 indicates the most important selection and whereby the Financial Institution 30 adds expertise about the type of criteria which, in practice, can be efficiently applied.

The criteria that are used to select lucky Winners from the group of participants could comprise:

- a random selection of Winners from the group of participants,
- a selection based on an early entry date for the User 10,
- a selection based on the number of an entry in a sequence, for instance; each 30th entry is a Winner,
- a limited number of lucky Winners per day.

It will be understood that the above examples are not limited and that a variety of other criteria could be used to select Winners.

The Financial Institution 30 could use the PAN as an identification means for the purpose of the Raffle Sale. The fact that the PAN of a User is linked to the Raffle participation means, in first instance, that the Financial Institution is able to award one Raffle entry to one PAN. This avoids a User to create multiple Merchants accounts and multiple Raffle entries linked to those Merchant accounts to try to increase the chances of winning the Raffle Sale.

According to an embodiment of the disclosure, the Financial Institution 30 can add to the PAN an anonym tag. This means that to each PAN an anonym tag is attached that is used as anonym RaffleID linked to the PAN of the User. This anonym tag is, for instance, a new 18 digit alphanumeric tag. This has the advantage that the form of the tag has the same alphanumeric character as the original PAN to which the tag is linked.

According to the present disclosure, reference is made to financial institutions, such as Financial Institution 30 as represented in FIG. 2. These Financial Institutions 30 are responsible for the processing of payments related to payment cards, such as Prepaid, Debit and Credit cards. According to the present disclosure, it is recognised that these Financial Institutions 30, have at their disposal databases comprising data relating to transactions linked to the financial relating to said payment cards.

In FIG. 2, with reference number 40 Database is indicated which is operated by the Financial Institution 30. This Database 40 comprises information about financial transactions related to the PAN of individual Users 10. The Database 40 may have the form of an AI engine. Thus, in the context of the present description, among others, the Database 40 is able to process a large amount of data relating to payments and is able to receive specific instructions to allow analysis of the transactions stored in the Database 40. The Database 40 is further adapted to output specific scores relating to transactions and behaviour linked to a specific entered PAN.

These scores could either be shared with the Merchant 20 or, as described below, be used in the selection process of lucky Winners.

According to the present disclosure, it is appreciated that Merchants 20 have use AI based tool to perform risk assessment prior to excepting payments, for instance when Merchants 20 are on-boarding new Users 10 in the BNPL-industry.

However, these AI based tools only provide reliable outputs, if the tools are fed with sufficient data to allow a complete assessment of risk.

According to the present disclosure it is appreciated that the Merchants 20 do not have access to information regarding the payment history, purchase frequency, habits, etc. of individual Users 10. This means, for instance, that Merchants 20 do not have access to information relating the insolvency risks of individual Users 10, whilst Financial Institutions 30, like Mastercard©, possess the historical transaction information of Users 10 and therefore are able to review consumer profiles and are able to assess risk.

According to the present disclosure, it is appreciated that the specific scores relating to transactions and behaviour linked to a specific entered PAN produced by the Financial Institute 30 can be shared with the Merchant 20. The Merchant 20 receives the scores as provided by the Financial Institution 30. The Merchant 20 enters the received data into their risk assessment tool. This means that the Merchant 20 uses the received scores relating to a specific PAN to enrich the data that Merchant 20 has already stored in their risk assessment tool related to the same PAN.

In yet a further step, the Merchant 20 is able to complete a risk assessment with the objective of making a decision on the risk related to allowing the use of a PAN for a payment. After running the risk assessment, the Merchant 20 obtains an indication of the risk relating to the use of the PAN for a purchase.

In this part of the procedure, the Merchant 20 has come to a stage where they can come to a number of conclusions and take a variety of decisions. A first possible conclusion can be that the payment card is verified and that the payment card is considered as safe for allowing payments to the Merchant 20. Based on this determination, the Merchant 20 may decide to allow the User 10 linked to PAN to be part of the lucky Winners.

A further possibility is that, the Merchant 20 concludes, based on the completed risk assessment, that the card is not secure. This conclusion can subsequently lead to a number of decisions. For instance, the Merchant 20 may accept the use of the related payment card and may accept the related risk. Alternatively, the Merchant 20 may accept the use of the card, but may request a pre-authorisation for a certain amount or request a security deposit. A further option is that the Merchant 20 decides that, based on the determination of the fact that the card is not secure, the payment by means of the card is refused and the concerned User 10 cannot be part of the lucky Winners.

According to an embodiment of the disclosure, the valuable information stored in the Database 40 is directly used by the Financial Institution 30 in the selection process of Winners in a Raffle Sale. This means that according to this embodiment, the criteria that have been defined for the Raffle Sale will comprise, for instance, criteria linked to a specific consumer profile.

The allow the use of the Database 40 and as indicated in FIG. 2, in a forth step 4, the Financial Institution 30, after having received a PAN relating a User 10 who participates in the Raffle Sale, sends the PAN and a query for specific information to Database 40.

As described can be sued to create an anonym RaffleID. This means that information from Database 40, relating transaction linked to a PAN, can be added to the anonym RaffleID to obtain anonym Consumer Profile packages linked to the Pan of the User 10.

In step 5 of FIG. 2, the Database 40 will send an array of the created Consumer Profile Packages to the Financial Institution 30. On receipt, the Financial Institution 30 will select lucky Winners using the criteria for the selection of lucky Winners defined as described above.

Once the lucky Winners have been selected, these Winners will be send as a batch to the Merchant 20 in a further step 6.

The Merchant 20 receives the batch of Winners and could review, according to an embodiment of the disclosure, the batch of Winners to confirm that agreement of the Merchant 20.

The Merchant 20 can subsequently use the batch of Winners to inform the participants of the Raffle Sale. This is represented by step 7 in FIG. 2.

In first instance, the Merchant 20 will inform the Winners and confirm that processing of the payment to complete the sale of the product. To allow the processing of the payment, the Merchant will use the PAN that was presented by the User 10 at the start of the Raffle Sale.

The Merchant 20 will also inform the participants that have not won the Raffle Sale. The Merchant 20 has the choice to inform the non-Winners or to offer the non-Winners an alternative reward for having competed. Like a discount on a future purchase.

The Raffle Sale is now completed. It is noted that the above mentioned procedure provides both an efficient, honest and safe tool for the Merchant to process a Raffle Sale. This is due to the fact that the Financial Institute has provided for the reception, selection and confirmation of the lucky Winners, without any time effort being needed from the Merchant 20.

It is noted that after the notification, by the Merchant 20, of the Winners and the non-Winners, the Merchant is faced with a problem related to the payment of the product and/or service by one or more of the Winners.

It is possible that the Merchant 20 uses the Pan of a Winner in an attempt to complete the sale and that the payment is refused. In this particular case, the Merchant has a variety of options to act. In first instance, the Merchant 20 could re-try the use of the same PAN. Alternatively or subsequently, the Merchant 20 could try to contact the concerned User 10 and request an alternative payment method.

As a further alternative, after having failed to complete the sale for a lucky Winner, the Merchant 20 could inform one of the non-Winners that because of the unsuccessful payment of one of the Winners, the purchase of one of the concerned products and/or services is now available for a non-winner. To allow efficient processing of this further procedure, the Financial Institution 30 could prior to step 6 of FIG. 2, produce a list with lucky Winners and a second list containing the participants who are put on a waiting list.

The invention claimed is:

1. Computer implemented method for processing a Raffle Sale, comprising the steps of:

putting on sale, by a Merchant, of a product and/or a service via a Raffle Sale, wherein a number of selected Winners from a group of Raffle Sale participants receive the right to purchase said product and/or service, defining, by the Merchant, criteria for the selection of Winners from a group of Raffle Sale participants, requesting, by a User, to be added to the group of Raffle Sale participants and presenting, by said User, a primary account number (PAN) as payment method, receiving, by the Merchant, the request of the User to be added to the group of Raffle participants and the PAN related with the User, sending, by the Merchant, the PAN of the User as a participant to the Raffle Sale, to a Financial Institution, responsible for the payment processing of payments linked with the PAN, receiving, by the Financial Institution, the PAN of the User and adding the User to a group of Raffle Sale participants, wherein adding the User to a group of Raffle Sale participants further comprises adding, by the Financial Institution, an anonym tag to the PAN to obtain an anonym RaffleID linked to the PAN, determining, by the Financial Institution, whether the group of Raffle Sale participants already contains the anonym RaffleID and, when the group of Raffle Sale participants already contains the anonym RaffleID, preventing creation of an additional raffle entry linked to the PAN and the anonym RaffleID, and storing, by the Financial Institution, the anonym RaffleID as a participant identifier in the group of Raffle Sale participants, applying, by the Financial Institution, the criteria for the selection of Winners from the group of Raffle Sale participants to select a number of Winners, wherein applying further comprises using, by the Financial Institution, a Database comprising information relating to financial transactions and/or behaviour relating to the PAN to obtain consumer information related to the PAN, using, by the Financial Institution, the obtained consumer information to create a Consumer Profile linked to the anonym RaffleID, and comparing, by the Financial Institution, obtained Consumer Profiles linked to respective anonym RaffleIDs with the defined selection criteria to select the number of Winners, sending, by the Financial Institution, a list of selected Winners linked to respective anonym RaffleIDs to the Merchant, receiving, by the Merchant, the list of selected Winners of the Raffle Sale, and informing, by the Merchant, the selected Winners and processing the payment of the product and/or service for the selected Winners.

2. The method of claim 1, wherein after the step of receiving, by the Merchant, of the request of the User to be added to the group of Raffle participants and the PAN related with the User the method further, comprises:

confirming, by the Merchant, the receipt of the request to the User.

3. The method of claim 1, wherein the step of defining, by the Merchant, criteria for the selection of Winners from a group of Raffle Sale participants comprises:

defining random-based selection criteria for selecting Winners.

4. The method of claim 1, wherein the step of defining, by the Merchant, criteria for the selection of Winners from a group of Raffle Sale participants comprises:

defining criteria for the selection of Winners, based on historic payment data, linked with a PAN.

5. The method of the claim 1, wherein the step of Receiving, by the Financial Institution, the PAN of the User and adding the User to a group of Raffle Sale participants, further comprises:

adding, by the Financial Institution, an anonym tag to the PAN to obtain an anonym RaffleID linked to the PAN.

6. The method of claim 1, wherein the method further comprises:

using, by the Financial Institution, a Database comprising information relating to financial transactions and/or behaviour relating to the PAN to obtain consumer information related to the PAN.

7. The method of claim 5, wherein the method further comprises:

using, by the Financial Institution, the obtained consumer information to create a Consumer Profile linked to the PAN.

8. The method according to The method of claim 7, when dependent on claim 4, wherein the step of applying, by the Financial Institution, the criteria for the selection of Winners from the group of Raffle Sale participants to thereby select a number of Winners comprises:

comparing, by the Financial Institution, the obtained Consumer Profiles with the defined selection criteria based on historic payment data, linked with a PAN.

9. The method of claim 1, wherein the method further comprises:

informing, by the Merchant, all Raffle Sale participants who have not been selected as Winners.

10. A data processing system comprising a processor configured to perform the steps of:

putting on sale, by a Merchant, of a product and/or a service via a Raffle Sale, wherein a number of selected Winners from a group of Raffle Sale participants receive the right to purchase said product and/or service, defining, by the Merchant, criteria for the selection of Winners from a group of Raffle Sale participants, requesting, by a User, to be added to the group of Raffle Sale participants and presenting, by said User, a primary account number (PAN) as payment method, receiving, by the Merchant, the request of the User to be added to the group of Raffle participants and the PAN related with the User, sending, by the Merchant, the PAN of the User as a participant to the Raffle Sale, to a Financial Institution, responsible for the payment processing of payments linked with the PAN, receiving, by the Financial Institution, the PAN of the User and adding the User to a group of Raffle Sale participants, wherein adding the User to a group of Raffle Sale participants further comprises adding, by the Financial Institution, an anonym tag to the PAN to obtain an anonym RaffleID linked to the PAN, determining, by the Financial Institution, whether the group of Raffle Sale participants already contains the anonym RaffleID and, when the group of Raffle Sale participants already contains the anonym RaffleID, preventing creation of an additional raffle entry linked to the PAN and the anonym RaffleID, and storing, by the Financial Institution, the anonym RaffleID as a participant identifier in the group of Raffle Sale participants, applying, by the Financial Institution, the criteria for the selection of Winners from the group of Raffle Sale participants to select a number of Winners, wherein applying further comprises using, by the Financial Institution, a Database comprising information relating to financial transactions and/or behaviour relating to the PAN to obtain consumer information related to the PAN, using, by the Financial Institution, the obtained consumer information to create a Consumer Profile linked to the anonym RaffleID, and comparing, by the Financial Institution, obtained Consumer Profiles linked to respective anonym RaffleIDs with the defined selection criteria to select the number of Winners, sending, by the Financial Institution, a list of selected Winners linked to respective anonym RaffleIDs to the Merchant, receiving, by the Merchant, the list of selected Winners of the Raffle Sale, and informing, by the Merchant, the selected Winners and processing the payment of the product and/or service for the selected Winners.

11. A computer-readable storage medium comprising instructions which, when executed by a computer, cause the computer to carry out the steps of:

putting on sale, by a Merchant, of a product and/or a service via a Raffle Sale, wherein a number of selected Winners from a group of Raffle Sale participants receive the right to purchase said product and/or service, defining, by the Merchant, criteria for the selection of Winners from a group of Raffle Sale participants, requesting, by a User, to be added to the group of Raffle Sale participants and presenting, by said User, a primary account number (PAN) as payment method, receiving, by the Merchant, the request of the User to be added to the group of Raffle participants and the PAN related with the User, sending, by the Merchant, the PAN of the User as a participant to the Raffle Sale, to a Financial Institution, responsible for the payment processing of payments linked with the PAN, receiving, by the Financial Institution, the PAN of the User and adding the User to a group of Raffle Sale participants, wherein adding the User to a group of Raffle Sale participants further comprises adding, by the Financial Institution, an anonym tag to the PAN to obtain an anonym RaffleID linked to the PAN, determining, by the Financial Institution, whether the group of Raffle Sale participants already contains the anonym RaffleID and, when the group of Raffle Sale participants already contains the anonym RaffleID, preventing creation of an additional raffle entry linked to the PAN and the anonym RaffleID, and storing, by the Financial Institution, the anonym RaffleID as a participant identifier in the group of Raffle Sale participants, applying, by the Financial Institution, the criteria for the selection of Winners from the group of Raffle Sale participants to select a number of Winners, wherein applying further comprises using, by the Financial Institution, a Database comprising information relating to financial transactions and/or behaviour relating to the PAN to obtain consumer information related to the PAN, using, by the Financial Institution, the obtained consumer information to create a Consumer Profile linked to the anonym RaffleID, and comparing, by the Financial Institution, obtained Consumer Profiles linked to respective anonym RaffleIDs with the defined selection criteria to select the number of Winners, sending, by the Financial Institution, a list of selected Winners linked to respective anonym RaffleIDs to the Merchant, receiving, by the Merchant, the list of selected Winners of the Raffle Sale, and informing, by the Merchant, the selected Winners and processing the payment of the product and/or service for the selected Winners.

* * * * *